(12) United States Patent
Santais et al.

(10) Patent No.: US 10,890,891 B2
(45) Date of Patent: Jan. 12, 2021

(54) METHOD FOR REGULATING A FACILITY FOR PROCESSING A SERIES OF CONTAINERS AND CORRESPONDING FACILITY

(71) Applicant: SIDEL PARTICIPATIONS, Octeville-sur-Mer (FR)

(72) Inventors: Franck Santais, Octeville-sur-Mer (FR); Fabian Petit, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 132 days.

(21) Appl. No.: 16/106,287

(22) Filed: Aug. 21, 2018

(65) Prior Publication Data

US 2019/0056712 A1 Feb. 21, 2019

(30) Foreign Application Priority Data

Aug. 21, 2017 (FR) ..................................... 17 57767

(51) Int. Cl.
*G05B 19/404* (2006.01)
*B29C 49/78* (2006.01)
(Continued)

(52) U.S. Cl.
CPC ........ *G05B 19/404* (2013.01); *B29C 49/4205* (2013.01); *B29C 49/78* (2013.01);
(Continued)

(58) Field of Classification Search
CPC ............ G05B 2219/49051; G05B 2219/35044
(Continued)

(56) References Cited

U.S. PATENT DOCUMENTS 6,112,880 A * 9/2000 Flix ...................... B65G 47/082
198/419.2
2010/0059331 A1 3/2010 Finger
(Continued)

FOREIGN PATENT DOCUMENTS

DE 10 2006 059001 A1 6/2008
DE 10 2013 014618 A1 3/2015
(Continued)

OTHER PUBLICATIONS

FR Search Report, dated Apr. 12, 2018, from corresponding FR 1757767 application.

*Primary Examiner* — Emilio J Saavedra (57) ABSTRACT

A method for regulating a facility for processing a series of containers includes an operating phase during which a first machine for processing containers that is equipped with a number of first stations is driven in rotation, and a second machine for processing containers that is equipped with a number of second stations is driven in rotation. The facility has a transfer point from the first to the second processing machine. The operating phase includes a synchronized and paired operating step in which the synchronized rotation of the first and second machines is accompanied by a repetitive series of pairing partners at the transfer point, each pairing partner including a first station arriving at the transfer point coincidentally with a second station, enabling transfer of a container from the first station of the pairing partner to the second station of the pairing partner.

19 Claims, 5 Drawing Sheets

(51) Int. Cl.
  *B65G 43/08* (2006.01)
  *B65G 43/10* (2006.01)
  *B29C 49/42* (2006.01)
  *B29C 49/36* (2006.01)
  *B29C 49/06* (2006.01)
  *B65G 47/84* (2006.01)

(52) U.S. Cl.
  CPC ............. *B65G 43/08* (2013.01); *B65G 43/10* (2013.01); *B29C 49/06* (2013.01); *B29C 49/36* (2013.01); *B29C 49/4273* (2013.01); *B65G 47/846* (2013.01); *G05B 2219/35044* (2013.01); *G05B 2219/49051* (2013.01)

(58) Field of Classification Search
  USPC ......................................................... 700/197
  See application file for complete search history.

(56) References Cited

U.S. PATENT DOCUMENTS

| | | | | |
|---|---|---|---|---|
| 2015/0059601 | A1* | 3/2015 | Domeier | ................ B41J 3/4073 101/40 |
| 2016/0214306 | A1* | 7/2016 | Linke | ................... B65G 47/846 |

FOREIGN PATENT DOCUMENTS

| | | |
|---|---|---|
| EP | 2 735 538 A1 | 5/2014 |
| WO | 2006/097796 A2 | 9/2006 |

\* cited by examiner

METHOD FOR REGULATING A FACILITY FOR PROCESSING A SERIES OF CONTAINERS AND CORRESPONDING FACILITY

FIELD OF INVENTION

The invention relates to the field of the manufacturing of containers (in particular bottles, flasks) such as containers made of plastic material, such as, for example, polyethylene terephthalate (PET).

BACKGROUND OF THE INVENTION

The manufacturing of such containers is carried out in a facility for the production of a series of containers, in which the containers undergo several processing steps, such as shaping, filling, etc. Such a facility comprises at least a first machine for processing containers and a second machine for processing containers, each equipped with first stations for processing containers and second stations for processing containers.

According to a known example, the stations for processing containers can move in rotation between an entry point of containers into the machine and an exit point of containers from said machine. During the manufacturing process, the containers are forwarded from machine to machine within which they undergo various processing steps. More specifically, each container from the series of containers is first received in a first machine at the entry point of the first machine, is processed, and then is brought to the exit point of the first machine to be transferred to a second machine for processing at an entry point of the second machine. The container is processed in the second machine and then is brought along to the exit point of the second machine to be transferred to a third machine at an entry point of the third machine, and so on until the final processing step of the container.

Thus, in the case of shaping containers from preforms, the preforms are heated, and then brought along into a transfer machine to be transferred into a forming machine so as to impart to the preform the final shape of the container. The containers that are shaped are in turn brought along into a transfer machine to be transferred to a filling machine to be filled. This is how it will be until the final processing step of the container. In particular, the containers should also, for example, be provided with covers and labels.

During such a process for manufacturing containers, in such a way as to ensure the continuous manufacturing of containers, it is necessary to synchronize the first and second processing machines of the facility so as to transfer a container that is received at a first station to a second station of a second processing machine. In other words, when a first station in which a container is received is at the exit point of the first processing machine, a second station is to be located at the entry point of the second machine so as to transfer the container to it, it being understood that the exit point of the first machine corresponds to the entry point of the second processing machine. In other words, according to the invention that is described below, when a transfer station is located at the exit point of the transfer machine, a forming station is located at the entry point of the forming machine.

In addition, to ensure the traceability of containers during the manufacturing process, the first and second stations of the first and second processing machines are preferably "paired," i.e., two stations of two different processing machines operate cooperatively to process a container. In other words, in the case of a preform that is forwarded by a transfer machine to a forming machine, a preform that is transferred by a particular transfer station of the transfer machine will always be shaped by the same forming station of the forming machine. Such a pairing of a first and a second station makes it possible, in the event that a defective container is detected, to work back up the manufacturing chain and to identify the container processing station that has led to the manufacturing of the defective container. In this way, the traceability of the containers is ensured.

To ensure the synchronization and the pairing of a first processing machine and a second processing machine, it is known to ensure the rotation of the first stations of the first processing machine and the second stations of the second processing machine by means of drive belts. In this way, the synchronized rotation but also the pairing of the first and second stations are ensured.

Owing to the mechanical slaving of the first and second processing means by means of drive belts, it is understood that it is not possible to lose the synchronization of the rotation of the first and second machines, nor the pairing of the first stations and second stations, for example after the machines are stopped.

However, because of this type of transmission of the rotational movement around a common axis of rotation, in the case of the presence of a defective processing machine and/or a defective processing station, it is necessary to stop the rotation of all of the machines of the group of machines driven by the common axis of rotation, rather than the rotation of just some of them. Apart from this, the processing machines that are used in such container manufacturing facilities are heavy and bulky machines that it takes a certain amount of time to stop and restart. It is therefore tedious and complicated to stop and restart all of the machines at the same time.

Furthermore, in the event of a problem in one or the other of the machines and/or stations, it is desirable to be able to stop the defective machine while maintaining the rotation of other machines of the facility, for example in such a way as to empty the production chain or to continue the forming of preforms that have already been heated in the heating station, to then store them in, a dedicated zone.

It is therefore advantageous to put the processing machines of the facility into rotation independently of one another in such a way as to be able to stop certain processing machines and to continue the rotation of others. However, with such an arrangement, it is possible to lose the synchronization of the first and second machines but also the pairing of the first and second stations during the restarting of the machine(s) that was/were stopped.

In addition, the drive belts that ensure the slaving of the processing machines pose problems of wear and tear.

SUMMARY OF THE INVENTION

One of the objects of the invention is to remedy the drawbacks above by proposing a method for regulating a facility for the production of a series of containers, making it possible to synchronize and pair the stations of the processing machines, in particular after one or more processing machine(s) is/are stopped.

For this purpose, the invention relates to a method for regulating a facility for processing a series of containers comprising:

an operating phase during which a first container processing machine that is equipped with a number of first stations is driven in rotation, and a second container processing machine that is equipped with a number of second stations is driven in rotation, with the facility having a transfer point of each of the containers from the first to the second processing machine, with the operating phase comprising a synchronized operating step in which the speeds of rotation of the first and second processing machines are synchronized in such a way that the frequency of passage from the two first successive stations to the transfer point is equal to the frequency of passage from the two second successive stations to the same transfer point, the operating phase comprises a synchronized and paired operating step in which the synchronized rotation of the first and second machines is accompanied by a repetitive series of pairing partners at the transfer point, with each pairing partner comprising a first station arriving at the transfer point at the same time as a second station in such a way as to make it possible to transfer a container from the first station of the pairing partner to the second station of the pairing partner, with the regulating method being characterized in that the driving in rotation of the first processing machine is done by means of a first drive motor, the driving of the second processing machine is done by means of a second drive motor that is separate from the first motor, with the regulating method comprising a desynchronized pairing step during which the first processing machine and/or the second processing machine is/are driven in rotation in desynchronized operation in such a way as to time a first station and a second station of one of the pairing partners to arrive at the same time at the transfer point.

It is understood that the rotational movement of the first processing machine and that of the second processing machine are independent of one another. Furthermore, it is also understood that it is possible to know, at any time, the position of the processing stations of the processing machines of the production facility.

Thanks to these arrangements, it is possible in particular to automate the regulating of the facility to synchronize the rotation of the processing machines and to pair the first and second stations of the first and second processing machines. The pairing partners make it possible to make a connection between the station that processed the container in the second processing machine and the station that processed the container in the first processing machine, because the processed container is passed from one to the other of the pairing partner stations at the transfer point. Thus, in the event a defective container is detected, it is possible to identify the processing station of the container that has led to the manufacturing of the defective container. This makes it possible to ensure the traceability of the containers that are manufactured in the production facility.

It is said that the speed of rotation of the first processing machine is synchronized with the speed of rotation of the second processing machine when these speeds have a ratio between them such that the frequency of passage of the two first successive stations at the transfer point is equal to the frequency of passage of the two second successive stations at the same transfer point. In other words, the product of the speed of rotation of the first machine multiplied by the number of first stations is equal to the product of the speed of rotation of the second machine multiplied by the number of second stations. The first and second processing machines are "desynchronized" in the opposite case, i.e., one of the processing machines has an overspeed in relation to the synchronization speed.

Container is defined both as a preform that is intended to be transformed into a container and the final container itself, designed to receive a liquid product.

In addition, during the desynchronization phase, because the rotational movement of the first machine is independent of the rotational movement of the second machine, it is possible to select the machine whose speed of rotation it is desired to modify. This is particularly advantageous in such facilities for production of a series of containers. Actually, as mentioned above, the processing machines are heavy and bulky and require a certain amount of time before acquiring their working speed of rotation. In other words, these machines have a significant moment of inertia and require a certain amount of time to carry out their powering-up. Then, it is advantageous to modify the speed of rotation of a machine that has less inertia and whose rotation can be controlled more easily. In addition, it is particularly advantageous to modify the speed of rotation of one of the processing machines, for example during the powering-up of the other processing machine. This makes it possible to save time in the regulating of the facility for production of a series of containers.

Advantageously, the method is a method for regulating a facility for production of a series of containers starting from a series of preforms, and in which:

the first processing machine is a preform feeding wheel and the second processing machine is a machine for shaping containers by blow molding preforms, or in which the first processing machine is a machine for shaping containers from preforms and the second processing machine is a wheel for output of shaped containers.

According to an embodiment, during the desynchronized pairing step, at a given moment, on the one hand, the angular distance between a first station of one of the pairing partners and the transfer point is determined, and, on the other hand, the angular distance between the second station of said pairing partner to the same transfer point is determined; one of the first or second machines has a rotational overspeed in relation to the speed that said first and second processing machines would have if they were synchronized, with the overspeed being calculated in such a way as to gradually make the first station and the second station of said pairing partner meet at the same time at the transfer point.

In the above-mentioned embodiment, the desynchronized pairing phase can be followed in an optional manner by a synchronized and paired operation. In particular, the overspeed can advantageously be regulated in such a way as to optimize the flexibility of the transition between the desynchronized pairing phase and the following synchronized and paired operating phase.

In the above-mentioned embodiment, the overspeed can be regulated in such a way as to optimize the speed and/or the precision of the desynchronized pairing phase.

Thanks to these arrangements, the pairing is carried out in a particularly simple and rapid manner. Furthermore, this synchronization can be done in an automatic manner.

As explained above, it is understood that it is advantageous to increase the speed of rotation of one processing machine that has less inertia than another, in other words, the one that has the lowest moment of inertia. This makes it possible, on the one hand, to obtain a rapid rise in rotation of said machine but also to better control the rotation of the first machine. These arrangements also make it possible to better control the deceleration of said machine for the purpose of the next synchronization step. In addition, as mentioned above, this makes it possible, during the powering-up of the second machine, to carry out the pairing of the first and second stations of the processing machines. Thanks to these arrangements, the facility for production of a series of containers will be regulated more quickly.

According to an embodiment, the method comprises, prior to the desynchronized pairing phase, a preliminary step of non-paired coordination timed to make a first station and a second station meet at the transfer point, not corresponding to one of the pairing partners, with the non-paired coordination step comprising:

Bringing along one of the machines from either the first or second processing machine to the point where one of the stations of said machine arrives at the transfer point, and then immobilizing said machine, preferably the station of said machine that is the closest to the transfer point.

Bringing along the other machine from either the first or second processing machine to the point where one of the stations of said machine arrives at the transfer point.

According to a variant, the method comprises, between the preliminary non-paired coordination step and the desynchronized pairing step, an intermediate synchronized operating step that is in phase but is non-paired.

Advantageously, the regulating method also comprises the step of:

Detecting the presence of containers in one or the other of the first processing machine (8) and second processing machine, and if one or the other of the first and second processing machines comprises at least one container:

Putting on stand-by the desynchronized pairing step,

Emptying the containers from one or both processing machines, and

Carrying out the desynchronized pairing step.

Thanks to these arrangements, the method for regulating the production facility is secured. In particular, containers received at the first stations are prevented from colliding with the second stations of the second machine. For example, if the first stations are stations for blow molding preforms and the second stations are gripping arms, the non-paired coordination step makes it easy to evacuate a container from a mold. The intermediate synchronized operating step that is in phase but is non-paired makes it easy to evacuate a series of defective containers from the molds, before continuing the pairing of the facility.

According to a second aspect, the invention relates to a facility for processing a series of containers comprising at least:

A first container processing machine, comprising a number of first stations that rotate, with said first processing machine being driven in rotation by a first synchronous motor, A second container processing machine, comprising a number of second stations that rotate, with said second processing machine being driven in rotation by a second synchronous motor, with each container of the series of containers being transferred to a second station at a transfer point, characterized in that the facility has a series of pairing partners, each comprising a first station and a second station, as well as a control unit that guides the first and second synchronous motors in such a way as to bring the first station and the second station of a pairing partner to the transfer point at the same time.

According to other characteristics of the facility:

Each container of the series of containers being received by a first station at an entry point of the first processing machine and is delivered at an exit point of the second processing machine, and/or in which the control unit guides the first and second synchronous motors in such a way as to bring the first station and the second station of successive pairing partners successively to the transfer point.

The first and second processing machines comprise first and second drive wheels of the first and second stations, with the first and second stations being uniformly distributed angularly respectively on each of the first and second drive wheels.

The first and second stations are rotated around vo axes (A. A') of rotation that are independent of one another.

The first processing machine is a container transfer machine, and the second processing machine is a machine for shaping containers, with the first stations comprising elements for gripping containers and the second stations comprising stations for shaping containers.

Each synchronous motor comprises an angular position encoder.

Advantageously, one of the first or second processing machines is a primary processing machine, comprising Np primary stations; the other of the first or second processing machines is an auxiliary processing machine that comprises Na auxiliary stations, with Np being equal to the product of Na by an integer k that is greater than or equal to 1. Thus, the number of pairing partners is Np. Each primary station is paired with a single auxiliary station. Each auxiliary station is paired with k primary stations.

BRIEF DESCRIPTION OF THE DRAWINGS

Other aspects and advantages of the invention will emerge from reading the following description, provided by way of example and given with reference to the accompanying drawings, in which.

DETAILED DESCRIPTION

Within the meaning of this invention, the terms "paired," "pairing," etc., mean that each second station of a second processing machine is associated with a first station that is identified as a first processing machine in such a way that when said first station is located at the exit point of the first processing machine, the corresponding second station is located at the entry point of the second processing machine.

Figure 1:
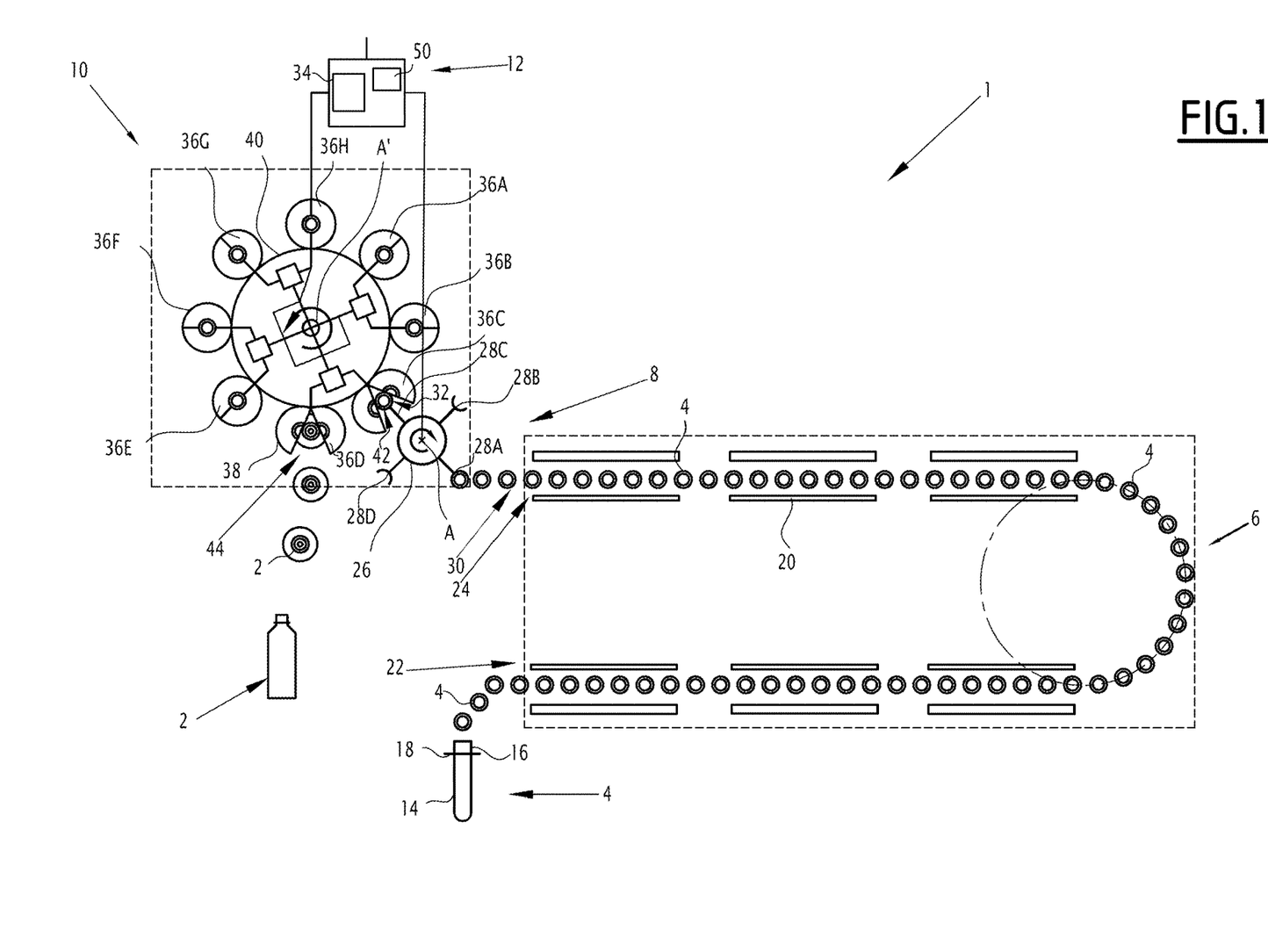
FIG. 1 is a diagrammatic top representation of a container production facility, comprising a heating station, a transfer machine, and a fo ling machine, FIGS. 2 and 3 correspond respectively to a list of pairing partners of the processing stations of the transfer machines and stations of the forming machine, and to an initial, non-paired coordination list.

With reference to FIG. 1, a facility 1 for producing a series of containers 2 from preforms 4 made of plastic material is described.

The facility comprises at least one heating station 6, a first container processing machine 8, for example a machine for transfer of a series of containers, a second container processing machine 10, for example a machine for forming a series of containers, and a control unit 12 of the production facility 1.

Each preform 4 comprises a body 14, a neck 16 and a ring 18. The body 14 has, for example, the shape of a test tube with a closed bottom and defines an internal volume. The neck 16 extends as a continuation of the body 14 opposite to the bottom and forms an upper opening through which a fluid can be introduced into the internal volume of the preform. The neck 16 of the preform has, for example, the final shape that it will have in the container 2 that is shaped from the preform 4 and comprises, for example, a threading on its outer wall to make possible the attachment of a cap to the container. The ring 18 extends between the body 14 and the neck 16 radially toward the outside and forms, for example, a transport ring through which the preform can be gripped and transported. The preform shape provided above is only by way of example, and other shapes could be considered, as long as the latter are suitable for forming a container by introduction of a fluid into the preform. Thus, by way of example, the preform could have a smooth neck, could lack a ring, and/or could have other variants of shapes according to various preform models that can be used in the production facility 1. The plastic material of the preform is, for example, polyethylene terephthalate (PET). As a variant, the plastic material could be different from PET, as long as this material can be made malleable and deformable to make it possible to produce a container by introduction of fluid into the preform.

The heating station 6 is arranged to heat each preform 4 at a reference temperature at which the preform 4 is in a malleable state and can be shaped into a container. The reference temperature is between the glass transition temperature and the temperature for crystallization of the material of the preform 4. The heating station 6 comprises, for example, a number of heating elements that are distributed in the heating station 6 along a path of the preforms 4 in the heating station 4 and are arranged to heat the series of preforms 4 that move in front of the heating elements using a transport device or conveyor 20 from the heating station 6. The path of the preforms 4 in the heating station runs between an inlet 22 and an outlet 24 of the heating station. With such a heating station 6 being known in the art, it will not be described in more detail here_.

At the outlet of the heating station 6, the heated preforms are moved to the forming machine 10 by the transfer machine 8.

The transfer machine 8 comprises, for example, a transfer wheel 26 that rotates around an axis A of rotation and a number of first processing stations 28A, 28B, 28C, 28D of the series of preforms 4. In this specific case, the first processing stations 28A, 28B, 28C, 28D are elements for gripping prefoitris.

The number of transfer wheels 26 of the transfer machine 8 can vary from one production facility to the next and depends on the arrangement of the production facility 1. A single transfer wheel 26 could be provided between the outlet 24 of the heating station 6 and the forming machine 8, as shown in FIG. 1.

The transfer wheel 26 is provided, on the periphery, with gripping elements 28A, 28B, 28C, 28D. The gripping elements 28A, 28B, 28C, 28D are uniformly distributed angularly on the periphery of the transfer wheel 26. In the particular example that is described here, the transfer wheel 26 comprises four gripping elements 28A, 28B, 28C, 28D, separated angularly from one another by an angle that is approximately equal to 90°. As a variant, the transfer wheel 26 could comprise more or fewer gripping elements.

Each gripping element 28A, 28B, 28C, 28D, for example of the clamp type, etc., is arranged to grasp a preform 4 from the series of preforms, for example by its ring 18, and to transport it to the forming station 10_.

To do this, the gripping elements 28A, 28B, 28C, 28D rotate between an entry point 30 and an exit point 32 of the transfer machine 8. More specifically, the gripping elements 28A, 28B, 28C, 28D move along a circular path that is defined by the transfer wheel 26 between the entry point 30 and the exit point 32 of the transfer machine 8.

In the example, at the entry point 30 of the transfer machine 8, one of the gripping elements 28A, 28B, 28C, 28D is able to remove a preform 4 that arrives at the outlet 24 of the heating station 6 and to bring it to the exit point 32 of said transfer machine 8 to transfer it to the forming machine 10.

The transfer machine 8 is furthermore a positive transport device, i.e., the transfer device 8 is arranged so that the position of a preform 4 is always known in the production facility 1. In this specific case, the transfer machine 8 is driven in rotation around the axis A by means of a first synchronous motor. More specifically, the transfer wheel 26 is driven in rotation by the first synchronous motor. With the angular position of a synchronous motor being known at any time, it is therefore possible to know the position of the transfer wheel 26 at any time, and therefore to deduce therefrom the position of the gripping elements 28A, 28B, 28C, 28D in the production facility 1 at any time. As a result, the position of a preform 4 in the transfer machine, and more generally in the production facility 1, is known at any time. In particular, at any time, the angular position of the gripping elements 28A, 28B, 28C, 28D in relation to the exit point 32 of the transfer machine 8 is known.

The second station for processing the series of preforms 4, i.e., the forming machine 10, comprises a number of second stations 36A, 36B, 36C, 36D, 36E, 36F, 36G, 36H for processing the series of preforms 4. In this specific case, the second stations 36A, 36B, 36C, 36D, 36E, 36F, 36G, 36H are forming stations that are each arranged to receive and form a preform 4 from the series of preforms 4 into a container. For this purpose, each forming station 36A, 36B, 36C, 36D, 36E, 36F, 36G, 36H comprises a mold 38 and a device for injecting a forming fluid, not shown in the figures. The mold 38 comprises a molding cavity having the shape of the container that is to be produced and arranged to receive the body 14 of the preform 4. The injection device is arranged to inject a pressurized forming fluid into the internal volume of the preform 4 by the upper opening of the latter so that the body 14 of the preform acquires the shape of the molding cavity. The forming fluid is, for example, a gas, for example pressurized air. Each forming station 36A. 36B, 36C, 36D, 36E, 36F. 36G. 36H can also comprise a stretching rod that is arranged to provide support on the bottom of the preform 4 so as to extend it along its axis.

Thus, by way of example, the forming machine 10 comprises eight forming, stations. The forming stations 36A, 36B, 36C, 36D, 36E, 36F, 36G, 36H are carried by a forming wheel 40, or carrousel, that rotates around an axis A' of rotation that is parallel to the axis A of rotation of the transfer wheel 8. The forming stations 36A, 36B, 36C, 36D, 36E, 36F, 36G, 36H are carried on the periphery of the forming wheel 40 in such a way that they move along a circular path that is defined by the forming wheel 28, between an entry point 42 and an exit point 44. In the particular example, the forming wheel 40 comprises eight gripping elements 36A, 36B, 36C, 36D, 36E, 36F, 36G, 36H, angularly separated from one another by an angle that is roughly equal to 45°. As a variant, the forming wheel 40 could comprise more or fewer forming stations.

At the entry point 42, the mold 38 is open and is arranged to receive a preform 4 that is obtained from the transfer wheel 22, and then the mold 26 is closed. The injection device is placed in fluid communication with the internal volume of the preform, and the forming fluid is injected into the preform during the movement of the forming station 36A, 36B, 36C, 36D, 36E, 36F. 36G, 36H between the entry point 42 and the exit point 44. At the exit point 44, the mold 38 is open, and the shaped container is extracted from the forming station 24. The structure and the operation of such forming stations 36A, 36B, 36C, 36D, 36E, 36F, 36G, 36H and, more generally, of the forming machine 10 are known as such and will not be described in more detail here.

Furthermore, the forming machine 8 is also a positive transport device, i.e., the forming machine 10 is arranged so that the position of a preform 4 is always known in the production facility 1. The forming machine 10 is driven in rotation around the axis A' by means of a second synchronous motor. More specifically, the forming wheel 40 is driven in rotation by the second synchronous motor. As mentioned above, with the angular position of a synchronous motor being known at any time, it is therefore possible to know the position of the forming wheel 40 at any time, and therefore to deduce therefrom the position of the forming stations 36A, 36B, 36C, 36D 36E, 36F, 36G, 36H in the production facility 1 at any time. As a result, the position of a preform 4 in the transfer machine, and more generally in the production facility 1, is known at any time. In particular, at any time, the angular position of the gripping elements 36A, 36B, 36C, 36D, 36E, 36F, 36G 36H in relation to the entry point 42 of the forming machine 8 is known.

Thus, each preform 4 from the series of preforms is transported by a gripping element 28A, 28B, 28C, 28D from the entry point 30 of the transfer machine 8 to the exit point 32 of the transfer machine 8, where the preform is transferred to a forming station 36A, 36B, 36C, 36D, 36E, 36F, 36G, 36H at its entry point 42. So that the preform 4 can be received in the mold 38, at the entry point 42 of the forming machine 10, the exit point 32 of the transfer machine 8 corresponds to the entry point 42 of the forming machine 10, i.e., the outlet 32 of the transfer machine 8 is arranged as a continuation of the inlet 42 of the forming machine 10.

It is noted that the exit point 32 of the transfer machine 8 meets with the entry point 42 of the machine 10 for shaping containers and constitutes a transfer point 32, 42 between the machine 8 and the machine 10.

In addition, according to the invention, the transfer machine 8 and the forming machine 10 are "paired," i.e., an identified gripping element 28A, 28B, 28C, 28D of the transfer machine 8 and a forming station 36A, 36B, 36C, 36D, 36E, 36F, 36G, 36H of the forming machine 10 operate cooperatively to process a preform 4. More specifically, each forming station 36A, 36B, 36C, 36D, 36E, 36F, 36G, 36H is associated with an identified gripping element 28A, 28B, 28C, 28D in such a way that when the identified gripping element 28A, 28B, 28C, 28D is at the exit point 32 of the transfer machine 8, the corresponding forming station 36A, 36B, 36C, 36D. 36E, 36F, 36G, 36H is at the entry point 42 of the forming machine 10. Thus, the path that is followed by a preform 4 is known as soon as the gripping element 28A, 28B, 28C, 28D by which the preform passes is known. Owing to the arrangements thereof, in the event that a defective container is detected, it is possible to work back up the manufacturing chain of said defective container and to identify the container processing station that has led to the manufacturing of the defective container.

Figure 2:
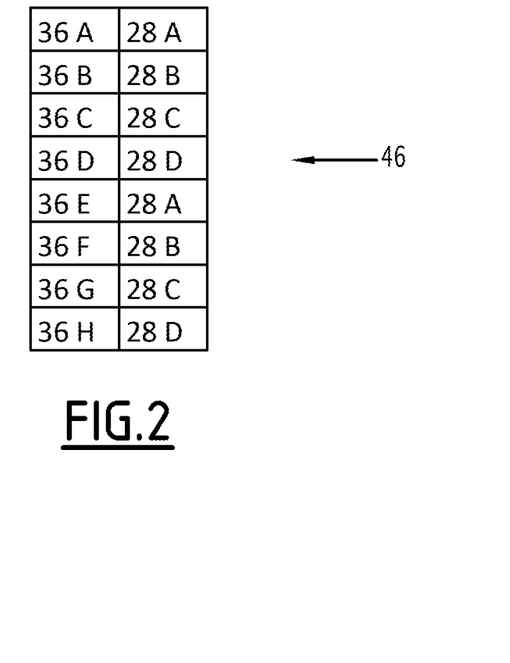

In the examples that are presented in detail in the figures, the forming machine 10 comprises two times more forming stations 36A, 36B, 36C, 36D, 36E, 36F, 36G, 36H than gripping elements 28A, 28B, 28C, 28D. In the embodiment that is presented in detail, an identified gripping element 28A, 28B, 28C, 28D is associated with two forming stations 36A, 36B, 36C, 36D, 36E. 36F, 36G, 36H according to a predetermined pairing, partners list 46, comprising for each partner a first station and a second station that are intended to arrive at the transfer point 32, 42 at the same time. The predetermined pairing partners list 46 is a list that is recorded in the memory 34 of the control unit 12. For example, such a predetermined pairing partners list 46 is presented in detail in FIG. 2. It is seen, in this list, that a forming station 36A, 36B, 36C, 36D, 36E, 36F, 36G, 36H is associated with a gripping element 28A, 28B, 28C, 28D. Thus, when the gripping element 28A is at the exit point 32 of the transfer machine 8, the forming station 36A or 36E is at the entry point 42 of the forming machine 10. Likewise, when the gripping element 28B is at the exit point 32 of the transfer machine 8, the forming station 36B is at the entry point 42 of the forming machine 10. The same holds true for the rest of the predetermined pairing partners list 46.

In this specific case, the forming machine 10 comprises two times more forming stations 36A, 36B, 36C, 36D, 36E. 36F, 36G, 36H than gripping elements 28A. 28B, 28C, 28D. The result is that, as can be seen in the predetermined pairing partners list 46, the same identified gripping element 28A, 28B, 28C, 28D is associated with two forming stations 36A, 36B, 36C, 36D 36E, 36F, 36G. 36H. By way of example, in accordance with the predetermined list 46, it is seen that the gripping element 28A is associated both with the forming station 36A and the foil ring station 36E.

Furthermore, so as to ensure the synchronization of the transfer machine 8 and the forming machine 10, i.e., a gripping element is located at the exit point 32 of the transfer machine 8, and a forming station 36A, 36B, 36C, 36D, 36E, 36F, 36G, 36H is located, at the same time, at the entry point 42 of the forming machine 10, and to maintain the pairing of the two machines 8, 10, the transfer machine has, in this example, a speed of rotation that is twice as high as the forming machine.

As explained above, the transfer machine 8 and the forming machine 10 can comprise a variable number respectively of gripping elements 28I, 28B, 28C, 28D and forming stations 36A, 36B, 36C, 36D, 36E, 36F, 36G, 36H. To parameterize the pairing, the processing machines 8, 10 comprise $2^n$ stations, with n being a whole number. This makes it possible to facilitate the regulating of the synchronization of the two machines 8, 10 and to simplify the pairing of the gripping elements 28A, 28B, 28C, 28D and the forming stations 36A, 36B, 36C, 36D, 36E, 36F, 36G, 36H. In this specific case, the number of gripping elements 28A, 28B, 28C, 28D is 4, with n not being equal to 2, and the number of forming stations 36A, 36B, 36C, 36D, 36E, 36F, 36G, 36H is equal to 8, with n being equal to 3. Furthermore, the fact that the number of forming stations is a multiple of two of the number of gripping elements also simplifies the pairing.

The method for regulating the facility 1 will now be described, Here, "regulating" is defined as the synchronization of the transfer machine 8 and forming, machine 10 and the pairing of the gripping elements 28A, 28B, 28C, 28D and forming stations 36A, 36B, 36C, 36D, 36E, 36F, 36G, 36H.

In a first step, a so-called initial synchronization step, the transfer machine 8 and the forming machine 10 are initially synchronized in rotation so that when a gripping element 28A, 28B, 28C. 28D is at the exit point 32 of the transfer station 8, a forming station 36A, 36B, 36C, 36D, 36E, 36F, 36G, 36H is at the entry point 42 of the forming machine 10.

Figure 4:
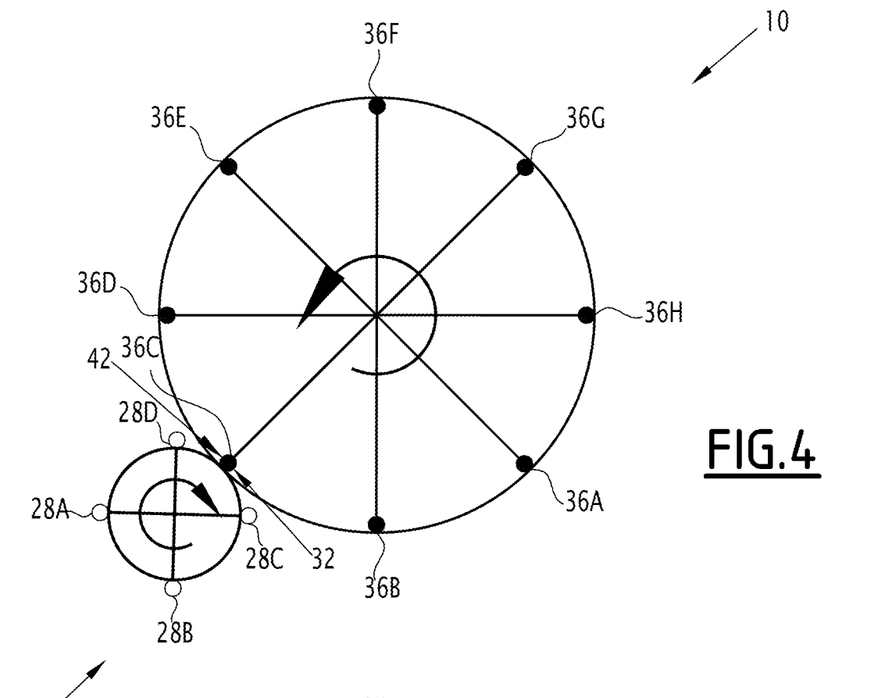
FIGS. 4 and 5 are diagrammatic top representations of transfer and forming machines during a non-paired coordination step of the first and second processing machines.

In a first sub-step of the initial synchronization step, shown in FIG. 4, the transfer machine 8 and the forming machine 10 are stopped in such a way that a forming station 36A, 36B, 36C, 36D, 36E, 36F, 36G, 36H is at the entry point 42 of the forming machine 10. In this specific case, this is the forming station 36C.

In a second sub-step of the initial synchronization step, the angular position of the gripping elements 28A, 28B, 28C, 28D in relation to the exit point 32 of the transfer machine 8 is determined.

Figure 5:
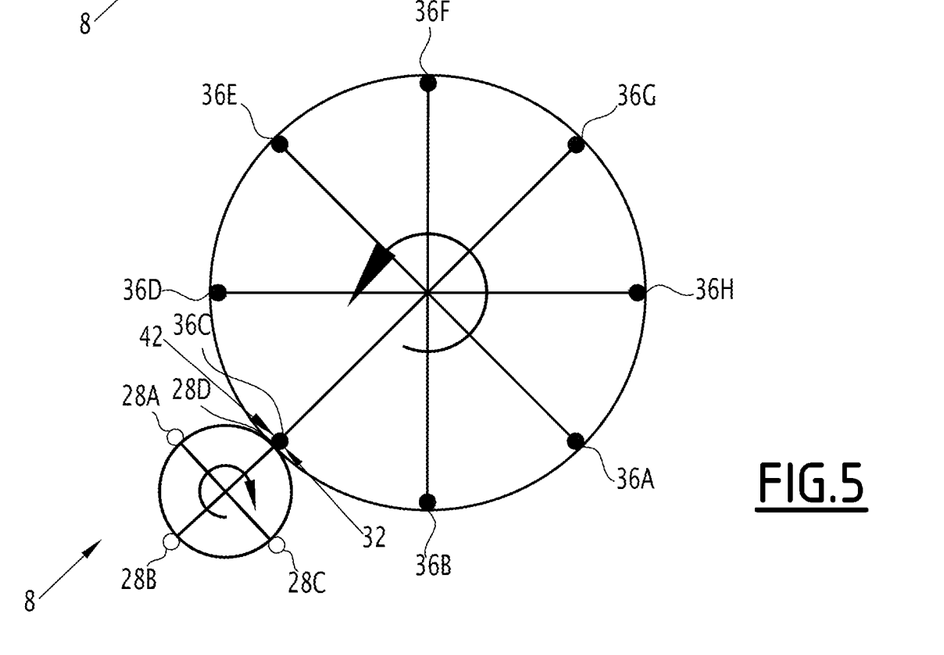

In a third sub-step of the initial synchronization step, the transfer machine 8 is rotated in such a way as to bring a gripping element 28A, 28B, 28C, 28D to the exit point 32 of the transfer machine 8. For example, the gripping element 28A, 28B, 28C, 28D that is brought to the exit point 32 of the transfer machine is the gripping element that is the closest to said exit point 32, in the direction of rotation of the transfer machine 8. In this specific case, the transfer machine 8 rotates clockwise, i.e., in the direction of the hands of a clock, as indicated by the arrow in the center of the wheel 26. Thus, as can be seen in FIG. 4, the gripping element 28D is the gripping element that is the closest to the outlet 32 of the transfer machine 8. As can be seen in FIG. 5, the gripping element 28D is therefore brought along to the exit point 32 of the transfer machine 8 by a rotation of an angle by approximately 45 degrees.

Figure 6:
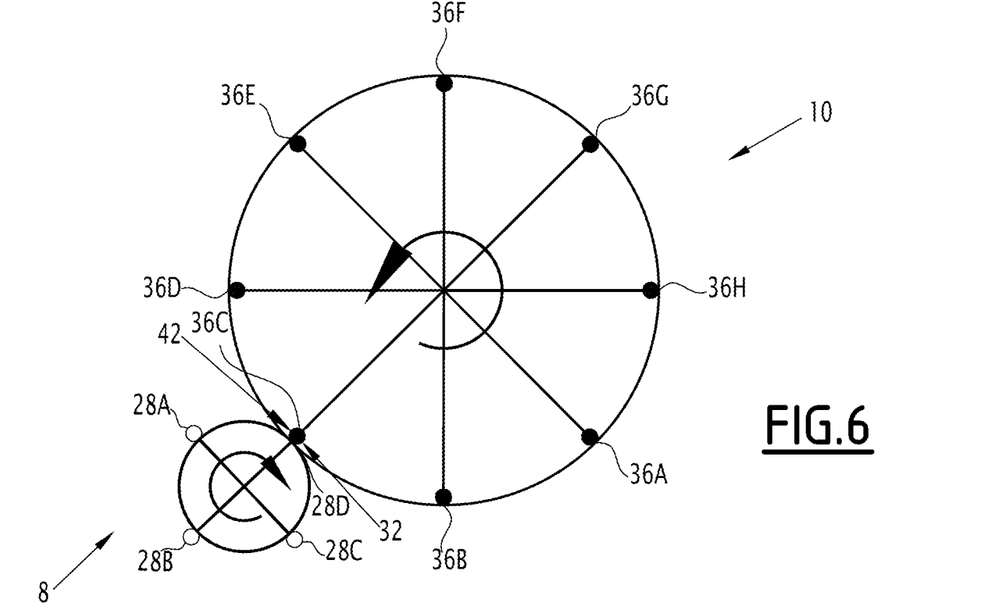
FIG. 6 is a diagrammatic top representation of the transfer and forming machines during an intermediate synchronized operating step that is in phase but is non-paired of the first and second processing machines.

In a fourth sub-step of the initial synchronization step, as can be seen in FIG. 6, the transfer and forming machines 8, 10 are rotated in a synchronized manner in such a way that a gripping element 28A, 28B, 28C, 28D is at the outlet point of the transfer machine at the same time as a forming station 36A, 36B, 36C, 36D, 36E, 36F, 36G, 36H is at the entry point 42 of the forming machine 10. In this specific case, the forming machine 10 rotates counter-clockwise, i.e., in the reverse direction of the hands of a clock, as indicated by the arrow in the center of the wheel 40.

Figure 3:
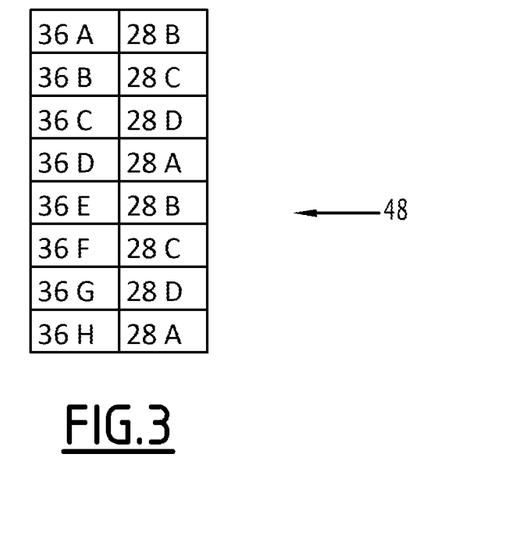

During the initial synchronization step, the position of the gripping elements 28A, 28B, 28C, 28D and forming stations 36A, 36B, 36C, 36D, 36E, 36F, 36G, 36H is known at any time. More specifically, during this initial synchronization phase, a computer 50 of the control unit 12 of the facility 1 recovers, over time, the position of the gripping elements 28A, 28B, 28C, 28D in relation to the exit point of the transfer machine, and the position of the forming stations 36A, 36B, 36C, 36D, 36E, 36F, 36G, 36H in relation to the entry point 42 of the forming machine. The computer 50 then draws up an initial, non-paired coordination list 48 of the gripping elements 28A, 28B, 28C, 28D and forming stations 36A, 36B, 36C, 36D, 36E, 36F, 36G, 36H, i.e., a list that identifies which gripping element is associated with which forming station 36A, 36B, 36C, 36D, 36E, 36F, 36G, 36H respectively at the exit point 32 of the transfer machine 8 and at the entry point 42 of the forming machine 10. This initial coordination list 48 is shown in FIG. 3.

The initial coordination list 48 is recorded in the memory 34 of the control unit. Then, the computer 50 compares the initial pairing list with the recorded predetermined pairing partner list 46. If the two lists are different, i.e., a forming station is not associated with an identified gripping element in the predetermined pairing partners list 46, a second phase of the method for regulating the facility 1 is implemented.

Figure 7:
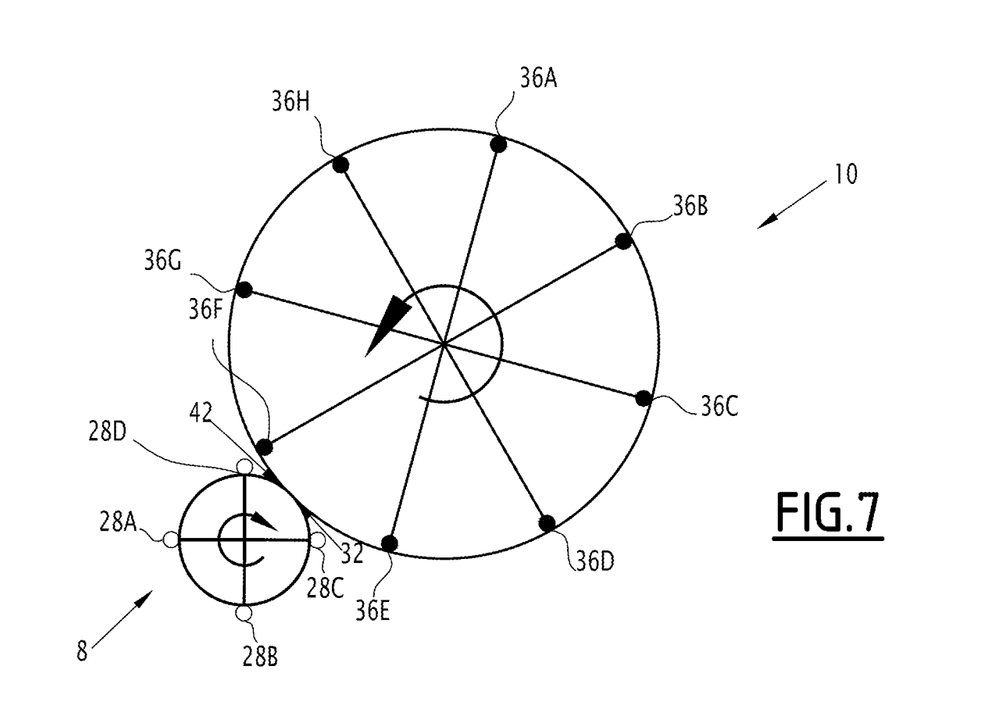
FIG. 7 is a diagrammatic top representation of transfer and forming machines during a desynchronized pairing step of the rotation of transfer and forming machines.

In the second step of the regulating method, the so-called desynchronization method, the rotation of the transfer machine 8 and the forming machine 10 is desynchronized. During this step, the speed of rotation of the transfer machine 8 is modified in such a way as to bring along an identified gripping element 28A, 28B, 28C, 28D to the exit point 32 of the transfer machine 8 and the forming station 36A, 36B, 36C, 36D, 36E, 36F, 36G, 36H that is associated with the identified gripping element 28A, 28B, 28C, 28D to the entry point 42 of the forming machine 10, according to the predetermined pairing partners list 46. In other words, when a corresponding forming station 6A 36B, 36C, 36D, 36E, 36F, 36G, 36H is at the entry point 42 of the forming machine 10, the identified gripping element 28A, 28B, 28C, 28D is at the exit point 32 of the transfer machine 8. This desynchronization phase is shown in FIG. 7 where a desynchronization between the two machines 8 and 10 is identified.

In this specific case, the speed of rotation of the transfer machine 8 is increased in such a way that a gripping element 28A, 28B, 28C, 28D that is identified in the predetermined pairing partners list 46 arrives at the exit point 32 of the transfer machine 8 at the same time as the forming station that is associated with this identified gripping element 28A, 28B, 28C, 28D arrives at the entry point 42 of the forming machine 10. To do this, the control unit 12 forwards a rotational speed command to the axis of rotation of the transfer machine 8.

In the embodiment that is described here, it is advantageous that this is the speed of rotation of the transfer machine that is increased. Actually, since the transfer machine 8 has less inertia than the forming machine 10, it is easier to speed it up quickly. In addition, the speed of rotation of the transfer machine 8 is more easily controlled than the speed of rotation of the forming machine 10, because the transfer machine 8 has a lower moment of inertia than that of the forming machine 10. Furthermore, it is advantageous to carry out the desynchronization phase during a powering-up of the forming machine 10. Time is thus saved in the regulating of the facility 1.

As a variant and by way of an alternative, during the desynchronization phase, the speed of rotation of the forming machine 10 is increased.

Figure 8:
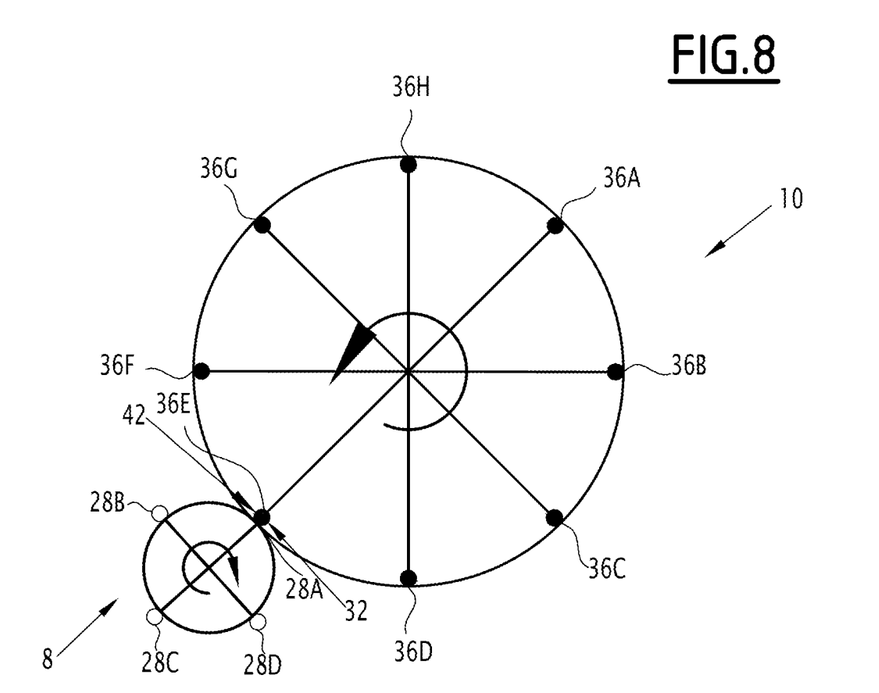
FIG. 8 is a diagrammatic top representation of the transfer and forming machines during a synchronized and paired operating step of the rotation of the forming machine and the transfer machine.

In a third step, a so-called "synchronization" step, once an identified gripping element 28A, 28B, 28C, 28D is associated with a forming station 36A, 36B, 36C, 36D, 36E, 36F, 36G, 36H according to the predetermined pairing list 46, the rotation of the transfer machine 8 and forming machine 10 is synchronized so that when an identified gripping station 28A, 28B, 28C, 28D is at the exit point 32 of the transfer machine 8, the forming station 36A. 36B. 36C. 36D, 36E, 36F, 36G, 36H that is associated with said identified gripping element 28A, 28B, 28C, 28D is at the entry point 42 of the forming machine 10. The control unit 12 then adapts the speed of rotation of the transfer machine 8 by forwarding a speed command, in this specific case a deceleration command, to the axis of rotation of the transfer machine 8. As can be seen in FIG. 8, the gripping elements 28A, 28B, 28C, 28D of the transfer machine 8 and the forming stations 36A, 36B, 36C, 36D, 36E, 36F. 36G. 36H of the forming machine 10 are paired according to the predetermined pairing list 46.

The regulating method comprises, for example, an additional step, a so-called "detection" step. This detection step is carried out before the desynchronization step that is presented in detail above. During this step, the presence of preforms 4 is detected in one or the other of the transfer machine 8 and/or forming machine 10. Because the transfer machine 8 and the forming machine 10 are positive transport devices, the position of a preform 4 is always known in the facility 1. It is therefore known whether preforms are present in the transfer machine 8 and in the forming machine 10.

As a variant, the gripping elements 28A, 28B, 28C, 28D and the forming stations 36A, 36B, 36C, 36D, 36E 36F, 36G, 36H are equipped with sensors of the presence of a preform 4. The data obtained from sensors are, for example, forwarded to the control unit 12 of the facility 1.

In the event that the presence of preforms in the processing machine or in the forming machine is detected, the desynchronization step is put on stand-by. In this case, for example, new preforms are no longer sent into the heating station. The preforms 4 that are already heated are evacuated from the transfer machine 8 and the forming machine 10 to a dedicated location.

Once the transfer machine 8 and the forming machine are emptied, the desynchronization step is implemented.

Thanks to the arrangements, gripping elements are prevented from colliding with the forming stations.

The invention has been described with reference to a transfer machine and a forming machine. As a variant, one or the other of these machines could just as easily be a transfer machine, a forming machine, a filling machine, a labeling machine, a machine for closing the containers, etc. One or the other of these two machines could also be two identical machines. In yet another variant, although the invention is described in relation to two machines, to facilitate understanding, the facility comprises more than two processing machines. The synchronization of the processing machines and the pairing of stations of these machines can be carried out by repeating the method described above.

In addition, with the machines being driven by synchronous motors, there is no mechanical connection between the machines, i.e., no drive belt for the rotational movement between the machines: the synchronization of the processing machines to one another and the pairing of the processing stations of these machines can therefore be lost. The method that is described above can be used for synchronizing the processing machines and for pairing the stations of these machines during the initial start-up of said machines or after said processing machines are stopped, after an incident, for example.

In addition, in this description, the terms "entry" and "exit" refer to the direction of circulation of the preforms 4 in the facility. In the sample embodiment that is illustrated above, the transfer machine is upstream from the forming machine 10. In other embodiments, the transfer machine 8 is downstream from the forming machine 10. In this case, the terms "exit point of the transfer machine" and "entry point of the forming machine" become "entry point of the transfer machine" and "exit point of the forming machine."

The invention claimed is:

1. A method for regulating a facility for processing a series of containers (4) comprising: rotating, during an operating phase, a first machine (8) and a second machine (10), where:

the first machine (8) is configured for processing containers (4) equipped with a number of first stations (28A, 28B, 38C, 28D), the second machine (10) is configured for processing containers (4) equipped with a number of second stations (36A, 36B, 36C, 360, 36E, 36F, 36G, 36H), and the facility has a transfer point of each of the containers from the first to the second processing machine, synchronizing, during the operating phase, the speeds of rotation of the first and second processing machines such that the frequency of passage from the two first successive stations to the transfer point is equal to the frequency of passage from the two second successive stations to the same transfer point, pairing, during the operating phase, the synchronized rotation of the first and second machines is using a repetitive series of pairing partners at the transfer point, with each pairing partner comprising a first station (28$i$) arriving at the transfer point at the same time as a second station (36$j$) in such a way as to make it possible to transfer a container from the first station of the pairing partner to the second station of the pairing partner, detecting the presence of containers (4) in one or the other of the first processing machine (8) and second processing machine (10), and if one or the other of the first processing machine (8) and second processing machine (10) comprises at least one container (4):

putting on stand-by the desynchronized pairing step, emptying the containers (4) from one or both processing machines (8, 10), and carrying out the desynchronized pairing step wherein the driving in rotation of the first processing machine is done by means of a first drive motor, the driving of the second processing machine is done by means of a second drive motor that is separate from the first motor, with the regulating method comprising a desynchronized pairing step during which the first processing machine and/or the second processing machine is/are driven in rotation in desynchronized operation in such a way as to time a first station and a second station of one of the pairing partners to arrive at the same time at the transfer point.

2. The method according to claim 1, wherein: the first processing machine is a preform feeding wheel and the second processing machine is a machine for shaping containers by blow molding preforms, or in which the first processing machine is a machine for shaping containers from preforms, and the second processing machine is a wheel for output of shaped containers.

3. The method according to claim 1, wherein: during the desynchronized pairing step, at a given moment, the angular distance between a first station of one of the pairing partners and the transfer point is determined, and the angular distance between the second station of said pairing partner to the same transfer point is determined;

and one of the first or second machines has a rotational overspeed in relation to the speed that said first or second processing machine would have if they were synchronized, with the overspeed being calculated in such a way as to gradually make the first station and the second station of said pairing partner meet at the same time at the transfer point.

4. The method according to claim 3, wherein the desynchronized pairing phase is followed by a synchronized and paired operation, and/or in which the overspeed is regulated as to optimize the speed and/or the precision of the desynchronized pairing phase, and/or to optimize the flexibility of the transition between the desynchronized pairing phase and the next phase of synchronized and paired operation.

5. The method according to claim 1, further comprising, prior to the desynchronized pairing phase, a preliminary step of non-paired coordination timed to make a first station and a second station meet at the transfer point, not corresponding to one of the pairing partners, with the step of non-paired coordination comprising:
   positioning either the first or second processing machine a the point where one of the stations of said machine arrives at the transfer point, and then immobilizing said machine,
   positioning the other machine from the first or second processing machine to the point where one of the stations of said machine arrives at the transfer point.

6. The method according to claim 5, further comprising, between the preliminary non-paired coordination step and the desynchronized pairing step, an intermediate synchronized operating step that is in phase but is non-paired.

7. The method according to claim 2, in which during the desynchronized pairing step, at a given moment, the angular distance between a first station of one of the pairing partners and the transfer point is determined, and the angular distance between the second station of said pairing partner to the same transfer Page 7 of 14, application Ser. No. 16/106,287 point is determined; one of the first or second machines has a rotational overspeed in relation to the speed that said first or second processing machine would have if they were synchronized, with the overspeed being calculated as to gradually make the first station and the second station of said pairing partner meet at the same time at the transfer point.

8. The method according to claim 2, comprising, prior to the desynchronized pairing phase, a preliminary step of non-paired coordination timed to make a first station and a second station meet at the transfer point, not corresponding to one of the pairing partners, with the step of non-paired coordination comprising:
   positioning either the first or second processing machine a the point where one of the stations of said machine arrives at the transfer point, and then immobilizing said machine,
   positioning the other machine from the first or second processing machine to the point where one of the stations of said machine arrives at the transfer point.

9. A facility for processing a series of containers (4) comprising a:
   a first machine (8) for processing containers (4), the first machine (8) comprising a number of first stations (28A, 288, 28C, 28D) that rotate, with said first processing machine (8) being driven in rotation by a first synchronous motor,
   a second machine (10) for processing containers (4), the second machine (10) comprising a number of second stations (36A, 36B, 36C, 36D, 36E, 36F, 36G, 36H) that rotate, with said second processing machine (10) being driven in rotation by a second synchronous motor,
   wherein each container (4) of the series of containers (4) is transferred to a second station (36A, 36B, 36C, 36D, 36E, 36F, 36G, 36H) at a transfer point (32), wherein the facility has a series of pairing partners each comprising a first station (28i) and a second station, as well as a control unit that guides the first and second synchronous motors in such a way as to bring the first station and the second station of a pairing partner to the transfer point at the same time,
   wherein the control unit is configured to:
   rotate, during an operating phase, the first machine (8) and a second machine (10), synchronize, during the operating phase, the speeds of rotation of the first and second processing machines such that the frequency of passage from the two first successive stations to the transfer point is equal to the frequency of passage from the two second successive stations to the same transfer point;
   pair, during the operating phase, the synchronized rotation of the first and second machines using a repetitive series of pairing partners at the transfer point, with each pairing partner comprising a first station (28i) arriving at the transfer point at the same time as a second station (36j) in such a way as to make it possible to transfer a container from the first station of the pairing partner to the second station of the pairing partner;
   detect the presence of containers (4) in one or the other of the first processing machine (8) and second processing machine (10);
   and if one or the other of the first processing machine (8) and second processing machine (10) comprises at least one container (4):
   put on stand-by the desynchronized pairing step,
   empty the containers (4) from one or both processing machines (8,10),
   and carry out the desynchronized pairing step.

10. The facility according to claim 9, in which each container (4) of the series of containers (4) being received by a first station (28A, 28B, 28C, 28D) at an entry point of the first processing machine (8) and is delivered at an exit point (44) of the second processing machine (10), and/or in which the control unit guides the first and second synchronous motors in such a way as to bring the first station and the second station of successive pairing partners successively to the transfer point.

11. The facility according to claim 9, in which the first processing machine (8) and the second processing machine (10) comprise a first drive wheel (26) and a second drive wheel (40) of the first stations (28A, 28B, 28C, 28D) and second stations (36A, 368, 36C, 36D, 36E, 36F, 36G, 36H), with the first stations (28A, 28B, 28C, 28D) and second stations (36A, 368, 3 6C, 36D, 36E, 36F, 3 6G, 36H) being uniformly distributed angularly respectively on each of the first drive wheel (26) and second drive wheel (40).

12. The facility according to claim 9, in which the first stations (28A, 28B, 28C, 28D) and second stations (36A, 36B, 36C, 36D, 36E, 36F, 36G, 36H) are rotated around two axes (A, A') of rotation that are independent of one another.

13. The facility according to claim 8, in which the first processing machine (8) is a machine for transfer of containers (4), and the second processing machine (10) is a machine for shaping containers (4), with the first stations (28A, 28B, 28C, 28D) comprising elements for gripping the containers (4) and the second stations (36A, 36V, 36C, 36D, 36E, 36F, 36G, 36H) comprising stations for shaping containers (4).

14. The facility according to claim 9, in which one of the first or second processing machines is a primary processing machine that comprises Np primary stations (36A, 36B, 36C, 36D, 36E, 36F, 36G, 3 6H); the other of the first or second processing machines is an auxiliary processing machine that comprises Na auxiliary stations (28A, 28B, 28C, 28D), with Np being equal to the product of Na by an integer k that is greater than or equal to 1.

15. The facility according to claim 9, in which each synchronous motor comprises an angular position encoder.

16. The facility according to claim 10, in which the first processing machine (8) and the second processing machine (10) comprise a first drive wheel (26) and a second drive wheel (40) of the first stations (28A, 2 8B, 28C, 28D) and second stations (36A, 36B, 36C, 36D, 36E, 36F, 36G, 36H), with the first stations (28A, 28B, 28C, 28D) and second stations (36A, 36B, 3 6C, 36D, 36E, 36F, 36G, 36H) being uniformly distributed angularly respectively on each of the first drive wheel (26) and second drive wheel (40).

17. The facility according to claim 10, in which the first stations (28A, 28B, 28C, 28D) and second stations (36A, 36B, 36C, 36D, 36E, 36F, 36G, 36H) are rotated around two axes (A, A') of rotation that are independent of one another.

18. The facility according to claim 10, in which the first processing machine (8) is a machine for transfer of containers (4), and the second processing machine (10) is a machine for shaping containers (4), with the first stations (28A, 28B, 28C, 28D) comprising elements for gripping the containers (4) and the second stations (36A, 36B, 36C, 36D, 36E, 36F, 36G, 36H) comprising stations for shaping containers (4).

19. The facility according to claim 10, in which one of the first or second processing machines k a primary processing machine that comprises Np primary stations (36A, 36B, 36C, 36D, 36E, 36F, 36G, 3 6H); the other of the first or second processing machines is an auxiliary processing machine that comprises Na auxiliary stations (28A, 28B, 28C, 28D), with Np being equal to the product of Na by an integer k that is greater than or equal to 1.

* * * * *